United States Patent

[11] 3,583,167

| [72] | Inventors | Christ F. Parks<br>Tulsa;<br>James E. Goddard, Sapulpa, both of, Okla. |
|---|---|---|
| [21] | Appl. No. | 823,159 |
| [22] | Filed | May 8, 1969 |
| [45] | Patented | June 8, 1971 |
| [73] | Assignee | The Dow Chemical Company<br>Midland, Mich. |

[54] PLUGGING OF PERMEABLE MATERIALS
3 Claims, No Drawings

[52] U.S. Cl. ..................................................... 61/36, 166/294
[51] Int. Cl. ..................................................... E02d 3/12, E21b 33/13
[50] Field of Search ........................................ 61/36, 35; 166/294, 295, 300, 274, 273, 270

[56] References Cited
UNITED STATES PATENTS

| 2,122,452 | 7/1938 | Clason | 166/294X |
| 2,238,930 | 4/1941 | Chamberlain et al. | 166/300ux |
| 2,272,672 | 2/1942 | Kennedy | 166/270 |
| 2,439,833 | 4/1948 | Wagner | 166/294 |
| 2,874,545 | 2/1959 | Twining | 61/36 |
| 3,053,675 | 9/1962 | Rhemar et al. | 166/294X |
| 3,291,212 | 12/1966 | Peacock | 166/294 |

*Primary Examiner*—Stephen J. Novosad
*Attorneys*—Griswold and Burdick, Bruce M. Kanuch and William R. Norris ABSTRACT: A method is provided for plugging permeable materials, preferably permeable earthen materials. An aqueous solution containing dispersed therein an organic material having an acid reaction is reacted with an acidic aqueous solution containing multivalent metal cations dispersed therein which form a precipitate with the organic material, in situ in the permeable material to form a precipitate, thus reducing the permeability of the material.

PLUGGING OF PERMEABLE MATERIALS

BACKGROUND OF THE INVENTION

One of the most difficult to control sources of large scale water pollution is the drainage of acid mine waters into water suppliers, e.g. streams, lakes, etc. The drainage water from some mines, e.g. coal mines, is acid in reaction. This acidity is due to the presence of water soluble sulfates of iron, aluminum, magnesium and other minerals which hydrolyze in water to give an acid reaction. Factors responsible for the formation of acid mine waters are the presence of pyrite in the coal and associated strata, exposure of these materials to water and air by mining, the chemical oxidation of fine pyrite and the concurrent growth of iron oxidizing and sulphur-oxidizing bacteria which aid the oxidation of the pyrite. These mine waters flow both over the surface and seep through permeable earthen formations into nearby sources of water. These acidic mine waters enter the water sources and reduce the alkalinity of the water. Iron and other mineral hydroxides precipitate in the water sources smothering biologic life natural to the waterways. Downstream the higher sulfate content of the water constitutes an unsolved problem for municipal and industrial water supplies. The river grows acid and corrosion of structures and floating equipment increases.

There have been several proposals to combat this serious problem. One widely taught method consists of diverting acidic mine waters through treatment plants whereby the water is neutralized and/or the various contaminating cations and anions are removed by directing the acid waters through ion exchange resins.

Secondly, it has been suggested to seal off the abandoned mines so that oxygen cannot be present to oxidize the pyrites and other sulfur minerals.

More recently it has been suggested to seal off earthen strata by contacting the acid-forming chemicals, notably iron pyrites, in the soil with an aqueous alkali metal silicate containing solution to form, by reaction with the sulfuric acid a silicate gel dispersed throughout the formation. This method essentially destroys the sulfuric acid at its source and precludes leaching out of the sulfuric acid or associate acid values.

However, none of these proposals have found complete success for various reasons. For example, it is physically impossible to divert all of the harmful acidic waters through treatment plants where they can be neutralized. Percolating water and subsurface acidic streams still continue to leach out the harmful pyrite compounds which continue on their way to nearby streams. Furthermore, the methods involving treatment plants can be very uneconomical. It is not always possible to completely seal abandoned mines. Also the acidic mine water problem is involved with operating mines thus preventing such sealing. Although the silica gel system does provide some help in preventing the leaching of the pyrite materials, this does not entirely solve the problem.

It would be desirable, therefore, if a method could be developed which would hinder the seepage of acid mine waters through permeable formations and into nearby streams. The present invention concerns a method for plugging permeable materials and finds particular use in reducing acid mine water pollution. The method can be employed in conjunction with other recognized methods if desired.

SUMMARY OF THE INVENTION

A permeable material, preferably an earthen strata, is contacted with a basic aqueous solution having dispersed therein an organic material having an acid reaction. An acidic solution containing dispersed therein multivalent cations, e.g. $Fe^{+2}$, $Fe^{+3}$, $Al^{+3}$, $Ca^{+2}$, and the like, is also contacted with the material and upon contact with the first solution a substantially acid-insoluble precipitate is formed in situ in the material. Acidic mine waters containing multivalent cations can comprise the acidic multivalent cation solution.

In areas where acid mine waters collect in pools, e.g., abandoned strip mines, mine shafts and the like, the basic solution or solid organic material having an acid reaction can be introduced directly into the water whereby a portion of it will react immediately to form a precipitate which will tend to seal the bottom of the pool. Some of the organic material will follow natural occurring seepage channels and therein form a precipitate to plug these channels.

In other areas, e.g. where surface waters run sporadically, the areas where seepage is occurring, or may occur, is treated with the basic solution. It is immaterial whether the basic solution precedes or follows the addition of the multivalent cation containing acidic solution, e.g. acid mine waters, to the permeable area. In both instances, upon contact with the multivalent cations, a precipitate will form thus plugging the strata.

As employed herein organic compounds having an acid reaction is intended to mean those compounds which when dissolved in aqueous medium tend to dissociate to form free hydrogen ions and anions.

DETAILED DESCRIPTION

Organic materials having an acid reaction and which form a precipitate, as a complex, chelate or other, with multivalent metal cations in solution, include certain fats, proteins, e.g. albumins, albuminates, peptones, organic acids, carbohydrates, polyhydroxy compounds, e.g. lignins, tannins, aromatic polyhydroxy compounds, e.g. polyhydroxy phenols, hydroxy benzoic acid, activated amino acid materials such as those disclosed in U.S. Pat. No. 3,396,104 and the like. The compounds preferably contain multifunctional groups, e.g., OH—SH—etc.

The actual structure of lignins and of the lignin sulfonic acid derivatives is not known. The lignin compounds may be obtained from various sources, among which are digestor liquors, which are a waste product of chemical pulp-making processes common in the papermaking industries. These liquors may be utilized in the present process either in concentrated or unconcentrated form. Also, lignin derived from such liquors or from various lignin-containing fibrous vegetation or decomposition products thereof may be used to supplement them or used in lieu of digestor liquors.

Wood is largely composed of lignocellulose; lignin and cellulose in some form of combination. In making paper pulp, chipped wood is treated with reagents adapted to bring the lignin into aqueous solution, leaving the cellulose as an insoluble residue. In the so-called soda process, the wood is extracted with caustic soda under high pressure and temperature, and the lignin with some minor constituents goes into solution as soda compounds. The liquid is termed soda black liquor. From the solution a lignin can be precipitated, along with some associated resins, by neutralization or acidification. The lignin being largely insoluble in water, the precipitate can be washed free of soluble matters leaving a fairly pure lignin. The lignin is not identical with natural lignin, that is lignin as it exists in the wood, but has rather parallel properties. It may be called "recovered lignin." In lieu of extracting wood with caustic soda, in the sulfate or kraft processes alkaline extracting solutions are employed containing various sulfur compounds; sulfides, polysulfides, thiosulfates, sulfates, etc. Such pulp-making processes also yield aqueous lignin solutions; these also containing sulfur compounds, and are known as sulfate black liquors. These liquors can be acidified to cause precipitation of lignin, and the lignin washed free of soluble matters and recovered in fairly pure form. Such lignin is not identical with the precipitated lignin from soda process liquors but is quite similar thereto. Liquors obtained by alkaline extraction of other vegetable substances such as straw, jute or corncobs are also suitable as a source of recovered lignin. The lignin obtained from these alkaline extraction liquors differ not only from natural lignin but also from the lignin compounds extracted from wood by various organic solvents and the sulfonated lignin derivatives obtained by the so-called bisulfite processes.

All these forms of lignins may be employed in the present invention. Dry sodium lignin from pine or dry lignin from pine are particularly effective in the present process. Lignin materials as waste from pulp mills and the like may be used directly in acid mine water pools or placed directly in abandoned mines where they come into contact with leaching waters and the like. When it is desirable to treat earth strata directly the lignin material is preferably dissolved in an alkaline solution and the strata treated with this solution. In this manner the plugging solution can penetrate the strata forming a precipitate in situ thus restricting further seepage of acid mine waters.

The tannins are a large group of water-soluble, complex organic compounds, widely distributed throughout the vegetable kingdom. Almost all trees and shrubs contain some tannin in the leaves, twigs, bark, wood, or fruit. The purest form of tannin is known as gallotannin which is obtained from nutgalls. Tannin is found in the bark from the Mangrove, Oak, Hemlock, Pine, and Willow trees; from the wood of Quebracho, Chestnut and Oak trees; from Sumac, and Gambir leaves, and from other vegetables. The tannins have been conventionally divided into two principal groups the catechol tannins and the pyrogallol tannins. Tannin materials from both these groups can be employed to prepare successful plugging agents useful in the present invention. They are preferably dissolved in alkaline solutions, and employed in the same manner as the lignin materials.

The amount of organic material having the acid reaction to be employed is merely one of practical matter and depends on the nature of the strata to be treated, quantity of acid mine waters and the like.

In the present process no attempt is made to neutralize mine waters but instead advantage is taken of the formation of precipitate with the iron aluminum and other compounds present in the waters to plug-existing strata and prevent the flow of contaminated waters into fresh waters, streams and the like. It is appreciated that the present method has some value as a means to partially purify contaminated mine waters since harmful cations are removed by the formation of the precipitate.

Example 1

The capacity of certain organic materials having an acid reaction to plug formation permeability was determined by the following procedure. In each example a dry sandstone core plug, one inch long and one inch in diameter, was employed as the test medium. In this first example a sandstone core plug was first saturated with a synthetic acid mine water solution at pH 2 (this water is also used in the following examples) containing the following constituents.

300 p.p.m. (parts per million) $Fe^{+2}$ as $FeSo_4$
75 p.p.m. $Al^{+3}$ as $Al_{2(SO4)3}$
0.0096 N $H_2SO_4$ A flow rate, at 20 p.s.i. of 124 mls./min. of this synthetic acid mine water was established through the sandstone core plug. Subsequently a solution of 1000 p.p.m. of tannin at pH 12, obtained as an oak bark extract, was passed through the sandstone plug at a pressure differential of 20 p.s.i. The flow of the tannin solution dropped immediately to 46 ml. per minute and decreased to 2.5 ml. per minute after 7 minutes. This represented a decrease in permeability of 98 percent. The flow rate in one minute intervals is tabulated in the following Table I.

TABLE I

| Test run | Fluid used | Flow rate, ml./ minute | Time interval, minutes | Remarks, percent decrease in permeability |
|---|---|---|---|---|
| 1 | Synthetic mine water | 124 | 60 | (¹) |
| 1A | 1,000 p.p.m. oak bark extract pH 12 | 46 | 1 | 63 |
| | | 23 | 2 | 81.5 |
| | | 12 | 3 | 90.5 |
| | | 8 | 4 | 93.5 |
| | | 6 | 5 | 95.3 |
| | | 4 | 6 | 97.0 |
| | | 2.5 | 7 | 98.0 |
| | | 2.5 | 8 | 98.0 |
| | | 2.5 | 9 | 98.0 |

¹ Constant rate.

Example 2

In this example the same procedure was followed as in Example 1, except that the tannin solution was first run through a clean sandstone plug followed by the introduction of the synthetic acid mine water. After the introduction of the synthetic mine water, the flow rate dropped to 38 ml. per minute at 20 p.s.i. Although the reduction in flow rate was only 50.7 percent, this indicates that significant plugging will occur regardless of the order of the addition of the plugging agent. The operating data for Example is set forth in the following Table II.

TABLE II

| Test run | Fluid used | Flow rate, ml./ minute | Time interval, minutes | Remarks, percent decrease in permeability |
|---|---|---|---|---|
| 2 | 1,000 p.p.m. oak bark extract pH 12 | 77 | 60 | (¹) |
| 2A | Synthetic mine water | 45 | 1 | 41.5 |
| | | 39 | 2 | 49.5 |
| | | 38 | 3 | 50.5 |
| | | 38 | 4 | 50.5 |
| | | 38 | 5 | 50.5 |

¹ Constant rate.

Example 3

In this example a commercially available sodium lignin from pine was employed as the plugging agent. The procedures of Examples 1 and 2 were followed. In the first set of tests the sandstone was first saturated with the synthetic acid mine water followed by the sodium lignin solution at 1000 p.p.m. and pH of 11. These runs are tabulated in Table III following, as test runs 3 and 3A.

In a second set of tests the sodium lignin solution was introduced through the sandstone first, as in Example 2, followed by the synthetic, acid mine water. The data for the test are set forth in the following table III, test runs 4 and 4A. In this example a faster plugging effect was shown by first introducing the lignin solution followed by the acid mine water. However, a greater decrease in permeability was effected by the reverse order of introduction.

TABLE III

| Test run | Fluid used | Flow rate, ml. minute | Time interval, minutes | Remarks, percent decrease in permeability |
|---|---|---|---|---|
| 3 | Synthetic mine water | 124 | 60 | (¹) |
| 3A | Sodium lignin solution | 48 | 1 | 61 |
| | | 24 | 2 | 80.5 |
| | | 15 | 3 | 88 |
| | | 12.5 | 4 | 90 |
| | | 11 | 5 | 91 |
| | | 9.1 | 6 | 92.5 |
| | | 7.5 | 7 | 94 |
| | | 5.5 | 8 | 95.5 |
| | | 3.1 | 9 | 97.5 |
| | | 2.5 | 10 | 98 |
| | | 2.1 | 11 | 98.3 |
| | | 2.0 | 12 | 98.5 |
| | | 2.0 | 13 | |
| | | 2.0 | 14 | |
| 4 | Sodium lignin solution | 90 | 1 | 88.7 |
| 4A | Synthetic mine water | 10.2 | 1 | 88.7 |
| | | 9.6 | 2 | 89.4 |
| | | 9.0 | 3 | 90.0 |
| | | 9.0 | | 90.0 |

¹ Constant.

Example 4

In this example the same procedures were employed as in Examples 1—3, except that a sumac tannin solution at 100 p.p.m. and pH 11 was employed as the test-plugging agent. The data for this example are set forth in following Table IV.

TABLE IV

| Test run | Fluid used | Flow rate, ml. minute | Time interval, minutes | Remarks, percent decrease in permeability |
|---|---|---|---|---|
| 5 | Synthetic mine water | 124 | 60 | (1) |
| 5A | Sumac tannin at 1,000 p.p.m. pH 11 | 90 | 1 | 27.4 |
|  |  | 46.5 | 2 | 62.5 |
|  |  | 27 | 3 | 79.2 |
|  |  | 17.5 | 4 | 86.0 |
|  |  | 12.5 | 5 | 90.0 |
|  |  | 8.8 | 6 | 93.0 |
|  |  | 6.6 | 7 | 94.7 |
|  |  | 5.1 | 8 | 96.0 |
|  |  | 4.1 | 9 | 96.7 |
|  |  | 3.6 | 10 | 97.3 |
|  |  | 3.5 | 11 | 97.4 |
| 6 | Sumac tannin | 3.5 | 12 | 97.4 |
| 6A | Synthetic mine water | 180 | 60 | (1) |
|  |  | 100 | 1 | 44.5 |
|  |  | 90 | 2 | 50.0 |
|  |  | 85 | 3 | 52.8 |
|  |  | 82 | 4 | 54.5 |
|  |  | 80 | 5 | 55.5 |
|  |  | 80 | 6 | 55.5 |
|  |  | 80 | 7 | 55.5 |

[1] Constant.

We claim:

1. A method for reducing the permeability of porous material which comprises: reacting a basic solution having dispersed therein at least one organic compound selected from the group consisting of at least one of a lignin or tannin said organic compound having an acid reaction which will form a precipitate when contacted with an acidic solution containing multivalent metal cations, with an acidic aqueous solution containing multivalent metal cations to form a metal organic precipitate in situ in the porous material.

2. The method of claim 1 wherein the permeable material is earthen strata.

3. The method of claim 2 wherein the acidic aqueous solution comprises acid mine waters containing multivalent cations dispersed therein.